United States Patent

Diskin

Patent Number: 5,272,940
Date of Patent: Dec. 28, 1993

[54] HELICALLY FLUTED TOOL

[75] Inventor: Phillip A. Diskin, Bloomfield Hills, Mich.

[73] Assignee: DiCO Corporation, Auburn Hills, Mich.

[21] Appl. No.: 895,906

[22] Filed: Jun. 9, 1992

[51] Int. Cl.⁵ .............................................. B21K 5/04
[52] U.S. Cl. ........................... 76/108.6; 76/DIG. 11; 76/DIG. 12; 407/118; 407/119; 408/144; 408/145
[58] Field of Search ................. 76/108.6, 108.1, 101.1, 76/DIG. 11, DIG. 12; 408/144, 145, 227, 230, 199; 407/118, 119, 30, 42, 32, 53, 34, 63

[56] References Cited

U.S. PATENT DOCUMENTS

| | | |
|---|---|---|
| 848,112 | 3/1907 | Matthews . |
| 2,782,489 | 2/1957 | Hargrove et al. . |
| 2,950,523 | 8/1960 | Frommelt et al. . |
| 4,086,733 | 5/1978 | Vig . |
| 4,182,587 | 1/1980 | Striegl . |
| 4,383,784 | 5/1983 | Gulbrandsen . |
| 4,681,485 | 7/1987 | Koelewijn . |
| 4,764,059 | 8/1988 | Wale . |
| 4,812,087 | 3/1989 | Stashko . |
| 4,830,123 | 5/1989 | Daley et al. ........................ 408/144 |
| 4,911,254 | 3/1990 | Keith ..................... 408/145 |
| 5,020,394 | 6/1991 | Nakamura et al. ........... 76/DIG. 12 |
| 5,036,732 | 8/1991 | Unozawa . |
| 5,070,748 | 12/1991 | Packer ......................... 76/DIG. 12 |
| 5,115,697 | 5/1992 | Rodriquez .................... 76/DIG. 12 |
| 5,193,944 | 3/1993 | Nishimura ...................... 407/119 |

OTHER PUBLICATIONS

DeBeers Industrial Diamond, DBC 80 Technical Publication Announcement, Apr. 1992.
DeBeers Industial Diamond, DBC Fact Sheet.
General Electric, BZN Compacts Products Line Flyer, Dec. 1986.

*Primary Examiner*—Roscoe V. Parker
*Attorney, Agent, or Firm*—Harness, Dickey & Pierce

[57] ABSTRACT

A rotary cutting tool has a plurality of helical channels located in the body of the rotary cutting tool. Individual cutter segments are bonded within each helical channel to form a continuous helical cutting edge that is machined to a finished state. An area of the tool body adjacent to the helical channel is removed to create helical flutes. Preferably, the segments are cut from disks of polycrystalline diamond (PCD) or polycrystalline cubic boron nitride (PCBN).

17 Claims, 2 Drawing Sheets

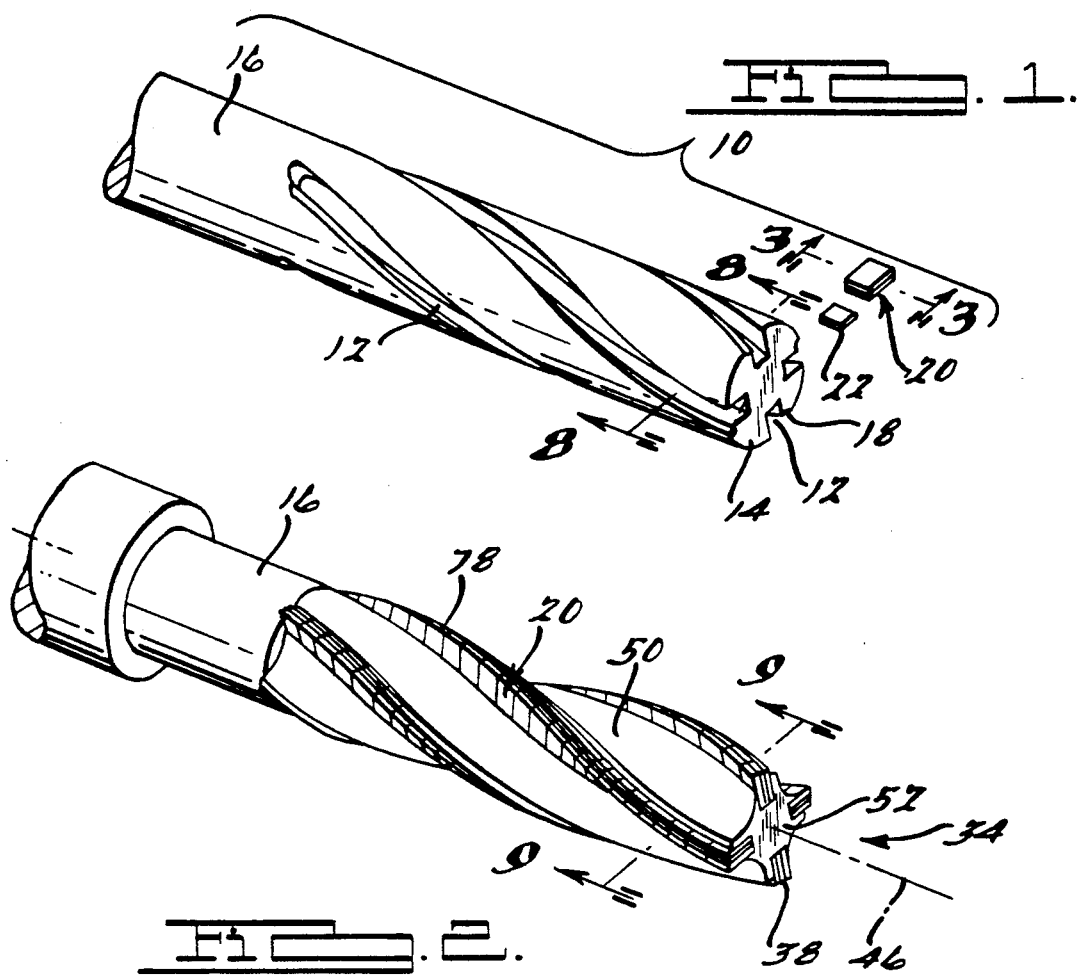
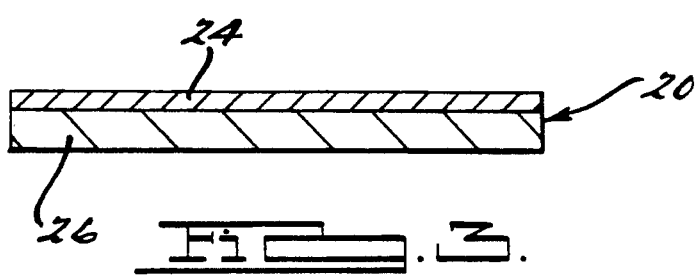
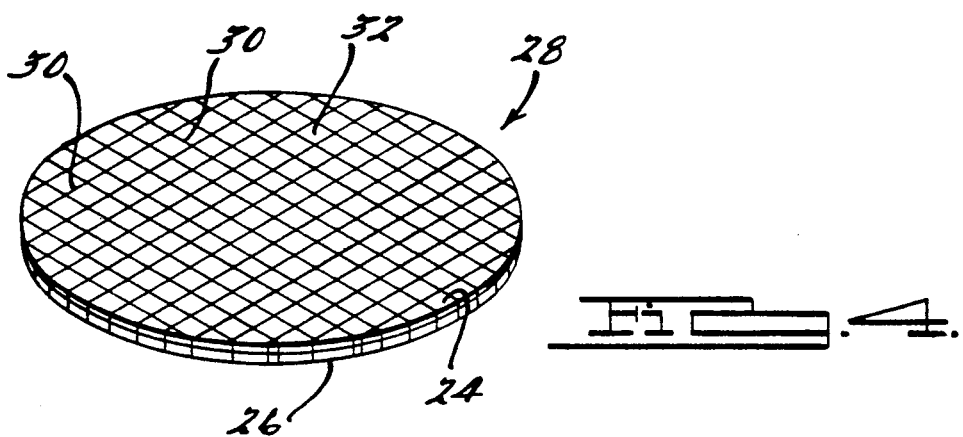

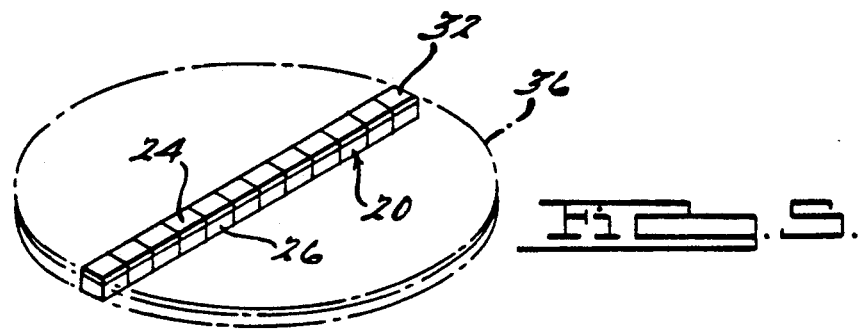
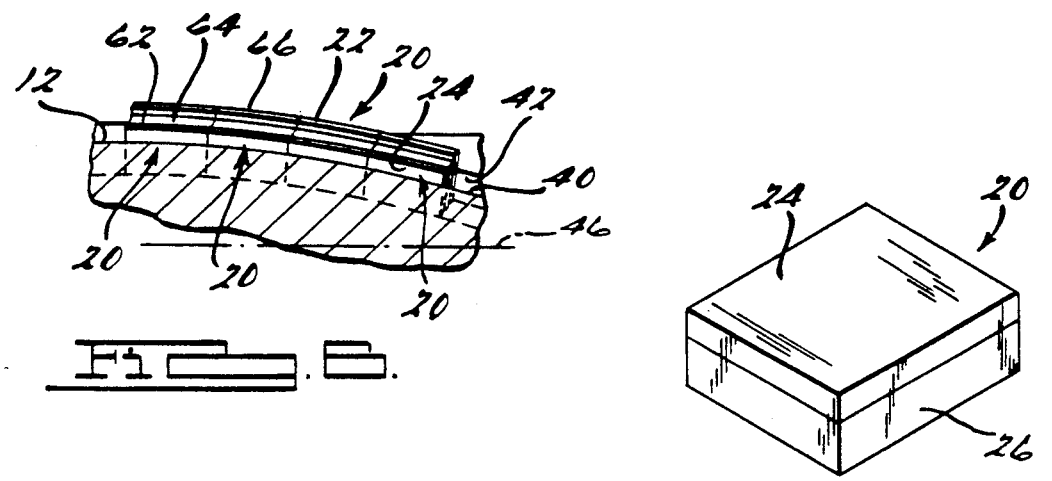
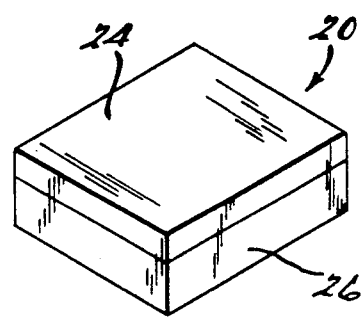
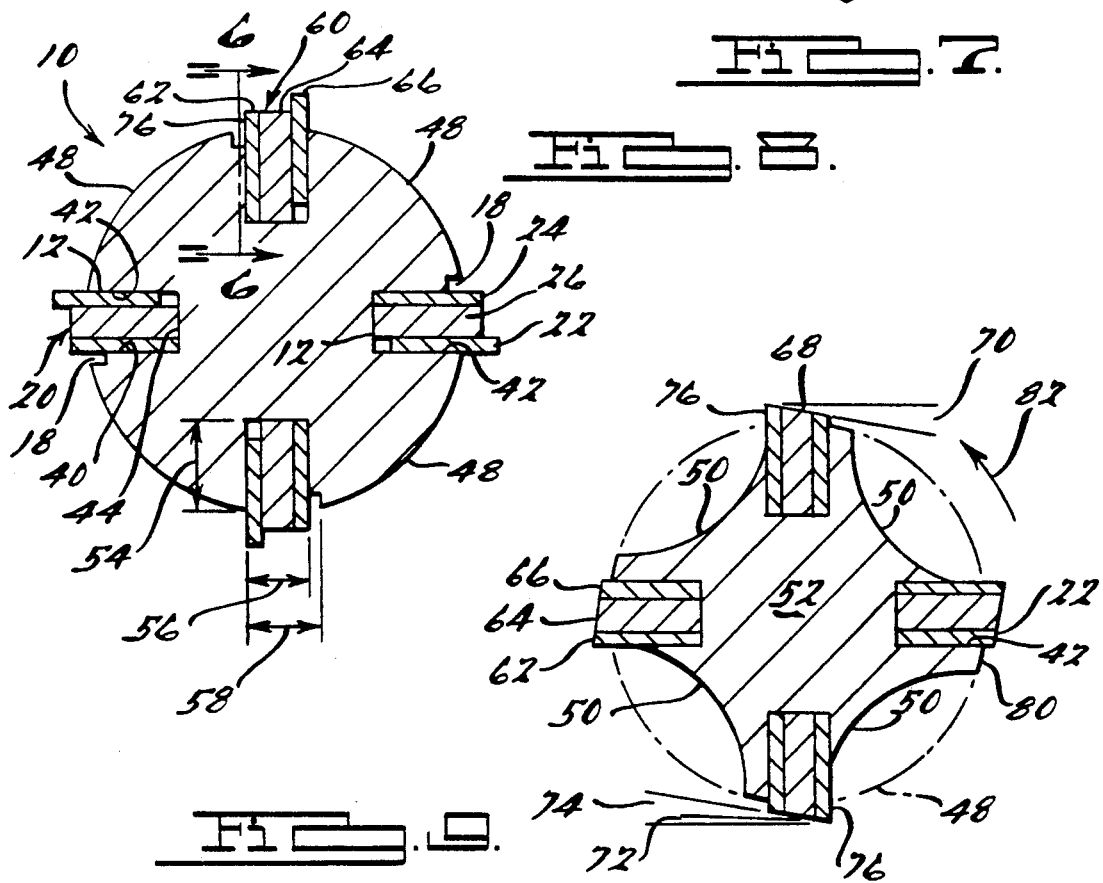

HELICALLY FLUTED TOOL

BACKGROUND OF THE INVENTION

This invention relates to rotary cutting tools that have helically shaped cutting edges. More particularly, the invention relates to a rotary cutting tool having at least one helical channel formed within the tool body in which a plurality of cutting segments are inserted within the channel to create an essentially continuous cutting edge for cutting a work piece.

DESCRIPTION OF THE PRIOR ART

It is known in the art to provide a tool body that has channels cut therein for inserting high performance cutting blades of fixed length. It is also known in the art to provide a tool body that has radially extending members for attaching cutting blades of fixed length thereto. The cutting blades generally are of tungsten carbide, high speed steel, polycrystalline diamond (PCD), or polycrystalline cubic boron nitride (PCBN). The cutting blades are generally fixed to the tool body by brazing, bonding, welding, or clamping. Such cutting blades generally are of a one-piece nature prior to insertion within the channels or attachment to the radially extending members. An example of some helically fluted and straight fluted rotary cutting tools are described in U.S. Pat. Nos. 848,112; 2,782,489; 2,950,523; 4,086,733; 4,182,587; 4,383,784; 4,681,485; 4,764,059; 4,812,087; and 5,036,732.

PCD and PCBN are particularly advantageous materials to use in cutting tools because of their excellent wear characteristics, among other things. However, the use of these materials has heretofore been generally limited to tools with essentially straight cutting edges since these materials are not readily bendable. As a result, there exists a need for a cutting tool design that permits the use of these types of materials while providing cutting edges of non-linear configurations such as helical shapes. Such a rotary cutting tool will allow tool manufacturers to create helically edged tools having desirable lengths as well as provide a tool that has cutter edges of varying types of high performance cutting material.

SUMMARY OF THE INVENTION

The present invention discloses a method of manufacturing a rotary cutting tool which is comprised of the steps of providing a tool body and forming at least one helical channel in the tool's body. A plurality of cutter inserts are affixed into each helical channel and blended together to form a smooth and continuous edge.

In one particular non-limiting example, the method includes the steps of first providing an elongated one-piece metallic body which has a longitudinal major axis. A plurality of helical channels are then formed in the metallic body and extend from one end of the tool's body toward the other end of the tool's body. A disk of cutting material is provided that has an outer layer of polycrystalline cubic boron nitride (PCBN) or polycrystalline diamond (PCD) and a supporting layer of tungsten carbide. The disk of cutting material is cut into a series of generally rectangular segments. A plurality of the rectangular segments are then inserted in the helical channels formed in the tool body so that the outer layer of PCD or PCBN material faces a common wall of the channel. Pieces of brazing material are then placed in the channel so that the brazing material interposes the segment and the channel thus causing the segments to become wedged in the channel. The brazing material is then heated thus causing the segments to become fixed in the channel. Outer portions of the segments are then ground to form an essentially continuous cutting edge which ultimately makes contact with a work piece. And finally, portions of the tool body between the channels are removed to form flutes therein.

BRIEF DESCRIPTION OF THE DRAWINGS

Further objects and advantages of the invention will become more apparent from the following description and claims, and from the accompanying drawings, wherein:

FIG. 1 is a perspective view of a spiral end mill tool illustrating some preliminary steps in making the present invention;

FIG. 2 is a perspective view of the completed end mill;

FIG. 3 is a sectional view taken substantially along lines 3—3 of FIG. 1;

FIG. 4 is a perspective view of a disk of cutting material showing parting lines which delineate a plurality of segments;

FIG. 5 is a perspective view of a row of segments that has been removed from the round disk of FIG. 4;

FIG. 6 is a cross-sectional view taken substantially along the lines 6—6 of FIG. 8;

FIG. 7 is a perspective view of one segment that has been cut from the row of segments shown in FIG. 5;

FIG. 8 is a cross-sectional view taken substantially along the lines 8—8 of FIG. with segments of cutting material and weld material added; and FIG. 9 is a cross-sectional view taken substantially along the lines 9—9 of FIG. 2.

DESCRIPTION OF THE PREFERRED EMBODIMENTS

A tool body 10, as shown in FIG. 1 is provided with four helical channels 12 extending from one end 14 of the tool body to the middle portion 16 of the tool body. Each of the channels have a slot 18 for aiding the setting of rectilinear disk segments 20 and brazing material 22 into the channels 12.

As shown in FIG. 3, the segment 20 is a two-layered configuration having a cutting material layer 24 that is adhered to a support layer 26. The cutting material layer 24 generally is of polycrystalline diamond (PCD) or polycrystalline cubic boron nitride (PCBN). The support layer 26 can be of either tungsten carbide, steel, or any other suitable material. The preferred embodiment has a cutting material layer 24 typically of 0.5 millimeters to 1.0 millimeters thick. Typically, the support layer 26 has a thickness of 1.1 millimeters to 2.2 millimeters, thus creating a general overall thickness of the combined layers of 1.6 millimeters to 3.2 millimeters. It will be appreciated that the thickness of these layers can be of a varying nature depending upon the application. Also, the cutting material layer 24 and support layer 26 can be of any type of material that is required for the job.

The individual segments 20, as shown in FIGS. 3 and 7, are formed from a disk of cutting material 28 as best illustrated in FIG. 4. The preferred embodiment uses a circular disk 28 of cutting material. Parting lines 30 are shown to illustrate on circular disk 28 the perimeter of each individual segment 20. The individual segments 20 are generally removed from the circular disk 28 of cutting material by the use of a travelling wire-electric discharge machine, otherwise known as EDM. Other methods that can be employed to remove segments 20 from circular disks 28 include, but are not limited to, laser cutting the segments 20 from the circular disk 28.

As illustrated in FIG. 5, a series of segments 20 may compose a straight length of cutting material 32 that has been removed from the circular disk 28 of cutting material. A straight fluted rotary cutting tool (not shown) could be created by inserting the unsegmented length of cutting material into a straight channel which has been formed within the tool body 10. However, to create a helical-shaped cutting tool 34, such a long continuous straight length would not be insertable within the helical channels 12 that are formed within the tool body 10. To alleviate this problem, the strip 32 undergoes an additional process of being cut into individual segments 20, each of which having its own outer layer 24 and support layer 26. To create the individual segments 20 from the strip 32, the same EDM process or laser cutting process can be used as was used to remove the strips 32 from the circular disk 28. Depending upon the length of the strip 32, many individual segments 20 can be created from a single strip 32. The length of the strip 32 is defined by the diameter of the disk of cutting material. Once a single segment 20 is removed from its strip environment 36, as illustrated in FIG. 7, the disk segment 20 is ready for insertion into the channel 12 that has been created within the tool body 10. This individual segment 20 creates one small portion of the cutting tool blade 38 which can be of any desired length given this design. As best illustrated in FIG. 6, the segments 20 are aligned in the channel 12 so that the segments 20 are adjacent to one another after being inserted into the channel 12.

As shown in FIG. 8, there are four channels 12 formed within the tool body 10, for receiving numerous segments 20. Each channel has a pair of parallel radially extending walls which define a leading edge wall 40, a trailing edge wall 42, and a seat portion 44 running along the longitudinal major axis 46 of the tool body 10. The channel further has a slotted portion 18 that is formed adjacent to the leading edge wall 40. Between the slot 18 of one channel 12 and an adjacent trailing edge wall 42 of another channel 12, there is a portion 48 of tool body 10 that undergoes a helical grinding process which results in helical flutes 50 being created. Once the helical grinding process has been completed, a web portion 52 of the tool body 10 is defined. It will be appreciated that the number of channels provided in the tool body, as well as the positioning of the channels within the tool body, can vary to satisfy the specifications of the tool that is desired. A fly cutter is one such example of a rotary cutting tool that employs a single helical channel 12.

The preferred embodiment has a channel depth 54 of 2.8 mm, a channel width 56 of 2.5 mm, and a channel slot opening width 58 of 3.8 mm. It will be appreciated that these tolerances can vary depending upon the configuration of the disk segment that is used. The channels 12 can be formed into the tool body 10 by a number of methods. One method is to provide a blank of steel and then to subject the blank to a helical machining process which results in a tool having helical channels 12 formed therein. Another method of creating helical channels 12 in a tool body 10 includes casting the channels into the tool body. The aforementioned methods of creating channels into a tool body can be used to create non-helical channels including, but not limited to, straight channels (not shown).

The method of making the helically fluted rotary cutting tool 34 will be described as follows. First, helical channels 12 are formed within the tool body 10. Given the proposed method of making a helically fluted tool 34, the length of the channel can be of any length that is desired. Once the channels 12 have been formed and the disk segments 20 have been removed from the strip 32, the tool 10 is ready to receive a plurality of segments 20 whereby the cutting material 24 of the disk is inserted adjacent to the leading edge wall 40 of the channel. See FIGS. 6 and 8. To help hold the disk 20 in the channel 12, a piece of weld material 22, such as silver solder brazing material, is inserted and wedged between the supporting layer 26 of the disk and the trailing edge wall 42 of the channel. This wedging action locks both the segment 20 and the weld material 22 into the channel until they can be permanently bonded to the tool body itself. This process of inserting the segments 20 and the weld material 22 into the channel 12 will be repeated until each channel has been filled with a complete row of segments 20 and weld material 22. This row of segments 20 and weld material 22 in each of the channels 12 will later be machined which will then define a single essentially continuous cutting surface for each channel. It is important to arrange each of the disks 20 and weld materials 22 adjacent to one another, in the channels, so as to allow for the creation of a continuous cutting surface. However, it will be appreciated that a tool may utilize only a few segments 20 in each channel 12. In that event, segments 20 may be spread out within the channel 12 to any desired position.

After the channels 12 are filled with the desired number of segments 20, the segments are then bonded to the cutting tool body 10 by heating the weld material 22 which thus causes the segments and the weld material to bond to the channels. By bonding the segments into the channels, this prevents the segments from being removed, or unlodged, from the channels during the later-described finishing process as well as when the tool is in operation. Other methods of bonding could be implemented as long as the method results in the segments and weld material being properly fixed to the tool body.

Once the segments 20 have been properly bonded to the tool body 10, the top edge 60 of the row of segments 20, which is made up of the top edge of the cutting material 62, the top edge of the support layer 64, and the top edge of the weld material 66, can now be machined to a desired finish thus creating a single relief 68 of a desired angle 70, as illustrated in FIG. 9. Alternatively, a primary relief angle 72 and a secondary relief angle 74 can also be machined from the top edge 60 of the row of segments 20. The cutting face 76 will also undergo any machining in order to obtain the desired finish. All of the segments undergo this common finishing process thus creating, in each helical channel, a continuous cutting edge 78 which is defined by a length approximate to the length of each channel 12. The maximum depth of cut into a work piece will be limited by the linear length of the continuous cutting edge 78 (see FIG. 2).

In the next step, the tool body material 48 adjacent to the cutting face 76 and the trailing edge wall 42 is removed thereby creating a flute 50. See FIG. 9. This material can best be removed by a helical grinding process whereby the result is the flute 50 and the web 52 being defined. The helical grinding process is continued until each of the areas adjacent to the cutting face 76 and trailing edge wall 42 have been removed. A portion of the tool's outer perimeter, the back support 80, remains after the helical grinding process and provides an area to communicate with the flute 50 and the trailing edge wall 42 of the channel 12.

The above-mentioned method results in a helically fluted rotary cutting tool 34 that has a continuous helical cutting face 78 of any desired length, as best illustrated by the end mill shown in FIG. 2. By completion of the helical grinding process, the true gullet and rake face are thereby defined.

It will be appreciated that conventional methods may be used to complete the remaining finishing operations. Centers may be provided (not shown) for conventional outside diameter grinding, radial clearances, and end teeth sharpening. Also, the final process of making the helically fluted rotating cutting tool 34 may include conventional finishing operations of preparing the neck, shank, tang, back taper on the cutting face, and any other operation that would be required to create a complete rotary cutting apparatus. The discussion of such is not discussed and/or illustrated any further here.

It will further be appreciated that the construction of the flute 50, as illustrated in FIGS. 2 and 9, is not limited to the construction presented. And furthermore, the rectilinear configuration of the segment 20, as illustrated in FIG. 7, can be of any type configuration that may be appropriate for the situation. Should the disk configuration 20 be non-rectilinear, then the configuration of channel 12 would be modified accordingly in order that the segment 20 would properly communicate with the channel 12.

Also, it will be appreciated that a rotary cutting tool 10 may have a construction, for example a slabbing cutter, where a shank is located on both ends of the tool 10 with helical channels 12 interposing the ends. Similarly, another embodiment may not have any shank at all.

When the tool is in operation, the tool rotates in a counter clockwise direction, as shown by the arrow 82 in FIG. 9, whereby the cutting face 76 of each segment makes contact with the work piece (not shown) thereby cutting the work piece and causing swarf to fall into the flute 50 of the tool 34 and to be extracted from the work piece.

Various modifications may be made within the scope of the invention as defined by the claims stated below.

What is claimed is:

1. A method of manufacturing a rotary cutting tool comprising the steps of:
    (a) providing a tool body;
    (b) forming at least one helical channel in said tool body;
    (c) affixing a plurality of cutter segments into said helical channel;
    (d) blending the cutter segments together to form a smooth and continuous cutting edge.

2. The method of claim 1 further comprising the steps of:
    (a) providing a disk of cutting material, said disk having a cutting material and a supporting layer; and
    (b) cutting the disk into a series of segments.

3. The method of claim 1 further comprising the steps of bonding said cutter segments into said helical channels, said bonding step includes inserting pieces of brazing material in the channels, said brazing material being located adjacent to the cutter segments to wedge said segments in said channels.

4. The method of claim 3 wherein the bonding step includes heating the brazing material to bond the segments in the channels.

5. The method of claim 1 wherein said forming step (b) is a machining operation for removing material from said tool body.

6. The method of claim 1 wherein step (b) comprises casting said channels into said tool body.

7. The method of claim 1 which further comprises the step of machining the plurality of segments to blend them into an essentially continuous helical cutting edge.

8. The method of claim 7 wherein said segments are made from polycrystalline diamond and tungsten carbide segments which are bonded together.

9. The method of claim 7 wherein said segments are made from polycrystalline cubic boron nitride and tungsten carbide segments which are bonded together.

10. The method of claim 1 further comprising the steps of removing portions of said tool body adjacent to said helical channels to create relief areas, said removing step comprises helically grinding said portion to provide a finished flute face.

11. A method of manufacturing a rotating cutting tool, said method comprising the steps of:
    (a) providing an elongated, one piece metallic body having a longitudinal major axis;
    (b) forming a plurality of helical channels in the body extending from one end of the body towards middle portions of the body;
    (c) providing a disk of cutting material, said disk having a cutting material of polycrystalline cubic boron nitride (PCBN) or polycrystalline diamond (PCD), and a supporting layer of tungsten carbide;
    (d) cutting the disk into a series of segments;
    (e) placing a plurality of the segments in the channels so that the cutting material of PCD or PCBN material faces a common wall of the channel;
    (f) using pieces of a brazing material to wedge the segments in the channels;
    (g) heating the brazing material to bond the segments in the channels; and
    (h) grinding outer portions of the segments to form an essentially continuous cutting edge.

12. The method of claim 11 further comprising the step of removing portions of the body between the channels to form flutes therein, said removing step includes helically grinding the portion of body between said channels.

13. The method of claim 11 wherein step (b) comprises machining or casting said helical channel into said tool body, said helical channels having a length along the longitudinal major axis of at least one-quarter inch.

14. The method of claim 11 wherein step (h) comprises creating a cutting face and a relief edge.

15. A rotary cutting tool, said cutting tool comprising:
    (a) an elongated metallic body having a longitudinal major axis;
    (b) at least one helical channel in said body;
    (c) a smooth and continuous cutting edge in the channel formed from a plurality of cutter segments affixed to the channel and blended together.

16. The cutting tool as claimed in claim 15 wherein said helical channels have a longitudinal major axis length of at least one-quarter inch.

17. The cutting tool of claim 15 wherein said channels are each defined by a pair of radially extending walls and a seat portion, with said segments including a cutting material of PCD or PCBN and a supporting layer, the cutting materials of adjacent segments facing a common wall.

* * * * *